US007889644B2

United States Patent
Su et al.

(10) Patent No.: US 7,889,644 B2
(45) Date of Patent: Feb. 15, 2011

(54) MULTI-TIME SCALE ADAPTIVE INTERNET PROTOCOL ROUTING SYSTEM AND METHOD

(75) Inventors: Kailing James Su, Richardson, TX (US); Aziz Mohammed, Plano, TX (US)

(73) Assignee: Alcatel Lucent, Paris (FR)

( * ) Notice: Subject to any disclaimer, the term of this patent is extended or adjusted under 35 U.S.C. 154(b) by 1155 days.

(21) Appl. No.: 10/645,257

(22) Filed: Aug. 21, 2003

(65) Prior Publication Data

US 2005/0041583 A1    Feb. 24, 2005

(51) Int. Cl.
- H04J 1/16   (2006.01)
- H04J 3/16   (2006.01)
- G06F 15/173 (2006.01)

(52) U.S. Cl. ............... 370/230; 370/252; 370/465; 709/224; 709/238

(58) Field of Classification Search ......... 370/229–235, 370/236.1, 236.2, 252, 465; 709/223, 232
See application file for complete search history.

(56) References Cited

U.S. PATENT DOCUMENTS

| | | | | |
|---|---|---|---|---|
| 6,286,052 | B1 * | 9/2001 | McCloghrie et al. | 709/238 |
| 6,598,034 | B1 | 7/2003 | Kloth | |
| 6,822,940 | B1 * | 11/2004 | Zavalkovsky et al. | 370/237 |
| 2002/0138643 | A1 * | 9/2002 | Shin et al. | 709/232 |
| 2003/0033519 | A1 * | 2/2003 | Buckman et al. | 713/153 |
| 2004/0109414 | A1 * | 6/2004 | Choi et al. | 370/230 |

FOREIGN PATENT DOCUMENTS

WO    WO 00/78004 A3    12/2000

OTHER PUBLICATIONS

Fine, et al.; Differentiated Services Quality of Service Policy Information Base; IETF Diffserv Working Group; Jun. 2002; pp. 1-93.
D. Morato, J. Araci, L.A. Diez, M. Izal and E. Magana, "On Linear Prediction of Internet Traffic for Packet and Burst Switching Networks", Computer proceedings, Tenth International Conference on Communications and Networks, pp. 138-143, 2001, Oct. 15-17, 2001.
J. Yang and M. Devetsikiotis, "On-Line Estimation, Network Design and Performance Analysis with Effective Bandwidths", In Proceedings of the International Teletraffic Congress, ITC-17, Salvador de Bahia, Sep. 24-28, 2001, Brazil.

(Continued)

*Primary Examiner*—Nittaya Juntima
(74) *Attorney, Agent, or Firm*—RG & Associates

(57) ABSTRACT

Method and apparatus for implementing multi-time scale adaptive routing in an IP network are described. One embodiment is a packet router that supports multi-time scale resource management. The packet router comprises a management agent that manages differentiated services policy information database operable to store policies on forwarding packets in the packet router; a resource server system that controls forwarding of packets in the packet router based on adaptive selections of policies from the policy information database; a flow measurement system that monitors packet flows through the packet router and generates statistic reports which affect the resource server systems selection of control; and a hardware forwarding engine that receives and forwards packets in response to the resource server system controls.

18 Claims, 7 Drawing Sheets

OTHER PUBLICATIONS

W. Shen, "On-Line Measurement of Effective Bandwidth and a Hierarchical Self-Sizing Framework", Masters Thesis, Department of Systems and Computer Engineering, Carleton University, Ottawa, Ontario, Canada, Apr. 15, 2002.

W. Shen and M. Devetsikiotis, "On-line Estimation of Effective Bandwidth for Long Range Dependent Traffic", submitted to the Second IFIP-TC Networking Conference, Newtorking 2002, May 19-24, 2002, Pisa, Italy.

S.A.M. Ostring and Sirisena, "The Influence of Long Range Dependence on Traffic Prediction", ICC IEEE International Conference on Communications and Networks, 2001, pp. 1000-1005, Jun. 11-14, 2001.

S. Floyd and V. Jacobson, "Random Early Detection Gateways for Congestion Avoidance", IEEE/ACM Trans. Net. vol. 1, No. 4, Aug. 1993, pp. 397-413.

S. Rooney, J.E. Van Der Merwe, S.A. Crosby and I.M. Leslie, "The Tempest: a Framework for Safe, Resource Assured, Programmable Networks", IEEE Communications Magazine, Oct. 1998, pp. 42-53.

H. Saito and K. Shiomoto, "Dynamic Call Admission Control in ATM Networks", JSAC, vol. 9, Sep. 1991, pp. 982-989.

S. Tartarelli, M. Falkner, M. Devetsikiotis, I. Lambadaris and S. Giordano, "Empirical Effective Bandwidth", In Proceedings of IEEE Globecom 2000, Dec. 2000, San Francisco, pp. 672-678.

R. Guerin, H. Ahmadi and M. Naghshineh, "Equivalent Capacity and Its Application to Bandwidth Allocation in High-Speed Networks", IEEE Journal on Selected Areas in Communications, 9(7), Sep. 1991, pp. 968-981.

M. Grossglauser and D.N.C. Tse, "A framework for robust measurement-based admission control"; IEEE/ACM Transactions on networking, vol. 7, Issue: 3, Jun. 1999, pp. 293-309.

S. Shenker, "Fundamental Design Issues for the Future Internet", IEEE JSAC, vol. 13 (7), Sep. 1981, pp. 1176-1188.

Q. Hao and M. Devetsikiotis, "Self-sizing and Optimization of High-Speed Multiservice Networks", In Proceedings of IEEE Globecom 2000, Dec. 2000, San Francisco, pp. 1818-1823.

S. Athuraliya, S.H. Low, V.H. Li and Q. Yin, "REM: Active Queue Management", In IEEE Network, May/Jun. 2001, pp. 48-53.

M. Montgomery and G. De Veciana, "On the Relevance of Time Scales in Performance Oriented Traffic Characterizations", In Proc. of IEEE INFOCOM '96, Apr. 1996, pp. 513-520.

S.A.M. Ostring, H.R. Sirisena and I. Hudson, "Rate control of elastic connections competing with long range dependent network traffic", IEEE Transactions on Communications, vol. 49, issue: 6, Jun. 2001, pp. 1092-1101.

R. Cacere et al., "Measurement and Analysis of IP Network Usage and Behavior", IEEE Communication Magazine, May 2000, pp. 144-151.

A Mohammed, E. Jones, H. Ogier, M.A. Vouk and Z. Dwekat. "DiffServ Experiments: Analysis of the premium Service over the Alcatel-NCSU Internet2 Testbed", In Proc. Of ECUMN '02, Colmar, France, Apr. 2002, pp. 124-130.

C.V. Hollot, V. Misra, D. Towsley and W.B. Gong, "On Designing Improved Controllers for AQM Routers Supporting TCP Flows". Proc. IEEE INFOCOM, Apr. 2001, pp. 1726-1734.

L. Breslau, S. Jamin and S. Shenker. "Comments on the Performance of Measurement-based Admission control Algorithms", In Proc. IEEE INFOCOM, 2000, pp. 1233-1242, Mar. 26-30, 2000.

J.D. Wetheral, J.V. Guttag and D.L. Tennenhouse, "Ants: A Toolkit for Building and Dynamically Deploying Network Protocols", IEEE Openarch '98, San Francisco, CA, Apr. 1999, pp. 117-129.

J. Yan, "Adaptive Configuration of Elastic High-Speed Multiclass Networks", In IEEE. Communications Magazine, May 1998, pp. 116-120.

S. Ki, S. Park and D. Arifler, "SMAQ: A Measurement-Based Tool for Traffic modeling and Queuing Analysis Part 2: Network Applications", IEEE Communications Magazine, Aug. 1998, pp. 66-70.

P. Wang, Y. Yemini, D. Florissi and J. Zinky, "A Distributed Resource Controller for QoS Applications", NOMS 2000-IEEE/IFIP Network Operations and Management Symposium, Honolulu, Hawaii, Apr. 2000, pp. 143-156.

M. Christiansen, K. Jeffay, D. Ott and F.D. Smith, "Tuning RED for Web Traffic", In Proc. IEEE/ACM Transactions on Networking, vol. 9, No. 3, Jun. 2001, pp. 249-264.

A. Terzis, L. Wang, J. Ogawa and L. Zhang, "A Two-tier Resource Mangement Model for the Internet", In Proc. of Global Internet: Application and Technology, Global Telecommunications Conference—Globecom '99, Dec. 1999, pp. 1779-1791.

IEEE P1520/TS/IP-001, "Proposed IEEE Standard for Application Programming Interfaces for Networks", http://www.ieee-pin.org, pp. 1-10, Nov. 23, 1998.

Y. Yemini and S. De Silva, "Towards Programmable Networks", IFIP/IEEE Intl. Workshop on Distributed Systems: Operations and Management, L'Aquila, Italy, Apr. 15, 1996, pp. 1-11.

A. Odlyzko, "Internet Pricing and History of Communications", Computer Networks, vol. 36, No. 5-6, Revised version Feb. 8, 2001, pp. 1-40.

E. Kohler, R. Morris, B. Chen, J. Jannotti and M.F. Kaashoek, "The Click modular router", 17th ACM Symposium on Operating Systems Principles, Dec. 1999, Kiawah Island, SC, pp. 1-34.

S. Kalyanaasundaram, E.K.P. Chong and N.B. Shroff, "Optimal Resource Allocation in Multiclass Networks with User-Specified Utility Functions", In Proceedings of the International Teletraffic Congress, ITC-17, Salvador de Bahia, Dec. 2001, Brazil, pp. 613-630.

G. Kesidis, "Bandwidth Adjustments Using On-line Packet-level Measurements", In Proc. SPIE Conference on Performance and Control of Network Systems, Boston, Sep. 19-22, 1999.

R. Keller, S. Choi, M. Dasen, D. Decasper, G. Fankhauser and B. Plattner, "An active router architecture for multicast video distribution", http://www.arl.wustl.edu/arl, Mar. 26-30, 2000.

S. Handelman, S. Stibler and N. Brownlee, "RTFM: New Attributes for Traffic Flow Measurement", Network Working Group, RFC 2724, Oct. 1999, pp. 1-16.

A.T. Campbell, I. Katzela, K. Miki and J. Vicente, "Open Signaling for ATM, Internet and Mobile Networks", Opensig '98, Oct. 5-6, 1998: http://comet.columbia.edu/opensig/activiites, pp. 1-17.

S. Choi, D. Descasper, J. Dehart, R. Keller, J. Lockwood, J. Turner and T. Wolf, "Design of a flexible open platform for high performance active networks", Proceedings of the Allerton Conferenct Oct. 1999, http://www.arl.wustl.edu/art.

A.T. Campbell, A. Eleftheriadis and C. Aurrecoechea, "End-to-end QoS management of Adaptive Flows", In IEEE Symposium of Multimedia Communications and Video Coding, New York, Oct. 1995.

"Forwarding and Control Element Separation (forces)", ForCES working group: http://www.ietf.org. pp. 1-3, Apr. 21, 2003.

* cited by examiner

MULTI-TIME SCALE ADAPTIVE INTERNET PROTOCOL ROUTING SYSTEM AND METHOD

BACKGROUND OF THE INVENTION

1. Technical Field of the Invention

The present invention generally relates to internet protocol ("IP") routers. More particularly, and not by way of any limitation, the present invention is directed to an architecture for implementing multi-time scale adaptive IP routers.

2. Description of Related Art

The deployment of complex value-added services on the Internet requires support for appropriate time-scale resource management and control on an on-going basis after the initial setup time of the network. Frequent interaction between services and the network calls for identification and implementation of sophisticated mechanisms that can allocate resources (e.g., links, switch capacity, etc.) optimally, isolate or dynamically share resources in a controlled fashion among various users, and change the use and allocation of resources in response to changes in conditions of the network and user requirements over time.

For QoS adaptation, the most developed adaptive resource allocation in IP is based on end-to-end feedback systems, such as TCP and ATM congestion control. In end-to-end feedback systems, the receiver must inform the sender that there is a problem when it arises. The main drawback to such systems is that often by the time adaptation has occurred, the condition might already have changed. Accordingly, such systems are typically not sufficiently fast.

Adaptation of the switching node behavior on the basis of DiffServ, Per-Hop Behaviors ("PHBs"), and variants of Random Early Detection ("RED") are commercially available. With these, policies and priorities are associated with the packets. When congestion occurs, packets are selected for dropping based on these policies and priorities. However, these are neither measurement-based nor are they designed to work in a coordinated fashion at multi-time scale.

IEEE has proposed a standard (IEEE 1520) that brings layering of IP router functionality for programmability and adaptation. This standard defines an overall infrastructure, but not a method or system for performing adaptation. The ForCES working group in IETF has proposed ideas that separate the control elements from forwarding elements in a way that can help introduce dynamic behavior at the node level. Also, network equipment manufacturers are currently beginning to support measurement-based adaptation. However, none of the foregoing solutions support implementation of a multi-time scale adaptive router.

SUMMARY OF THE INVENTION

Accordingly, the present invention advantageously provides an architecture for implementing multi-time scale adaptive IP routers. One embodiment is a packet router that supports multi-time scale resource management. The packet router comprises a management agent that manages differentiated services policy information database operable to store policies on forwarding packets in the packet router; a resource server system that controls forwarding of packets in the packet router based on adaptive selections of policies from the policy information database; a flow measurement system that monitors packet flows through the packet router and generates statistics reports which affect the resource server systems selection of control; and a hardware forwarding engine that receives and forwards packets in response to the resource server system controls.

Another embodiment is a system for supporting multi-time scale resource management in a packet router. The system comprises means for managing a differentiated services policy information database that stores policies on forwarding packets in the packet router; means for controlling forwarding of packets in the packet router based on adaptive selections of policies from the policy information database; means for monitoring packet flows through the packet router; means for generating statistic reports that affect the resource server systems selection of control; and means for receiving and forwarding packets in response to the resource server system controls.

Another embodiment is a method of providing multi-time scale resource management in a packet router. The method comprises managing a differentiated services policy information database that stores policies on forwarding packets in the packet router; controlling forwarding of packets in the packet router based on adaptive selections of policies from the policy information database; monitoring packet flows through the packet router; generating statistic reports that affect the forwarding of packets in the packet router; and receiving and forwarding packets in response to the forwarding of packets in the packet router.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1A:
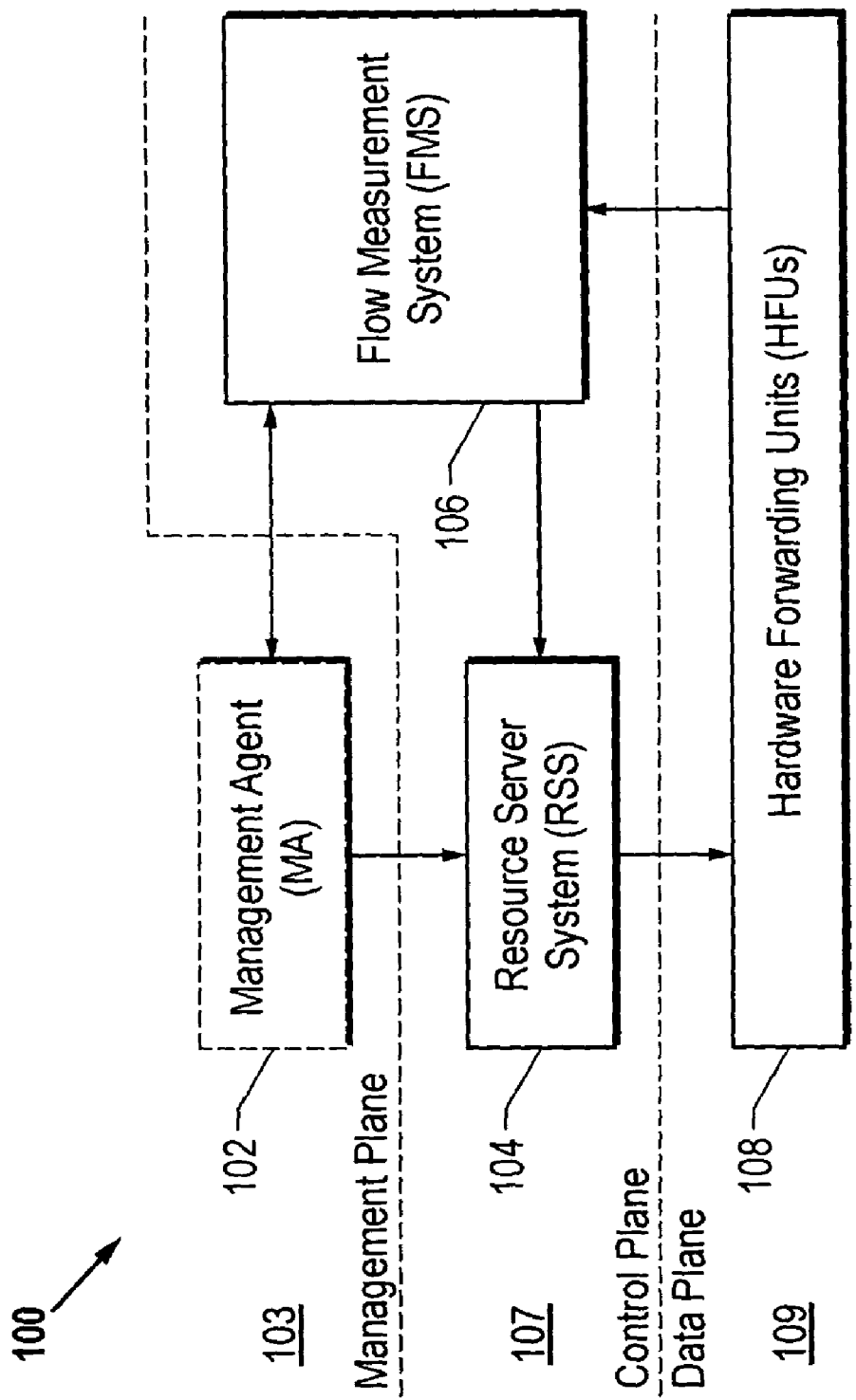
FIG. 1A is a block diagram of one embodiment of an enhanced IP router for supporting multi-times scale resource management in an IP network.

In the drawings, like or similar elements are designated with identical reference numerals throughout the several views thereof, and the various elements depicted are not necessarily drawn to scale.

FIG. 1A illustrates a framework for an enhanced IP switching node, or router, 100 that supports multi-time scale resource management in an IP network. For purposes of illustration, operation of the node 100 will be described in the case of DiffServ-based quality of service ("QoS") adaptation through Policy Information Base ("PIB") and Service Level Agreement ("SLA") management functionality. As illustrated in FIG. 1A, the node 100 includes a framework for traffic monitors and mechanisms for closed loop feedback at data, flow, and network time-scale level controls. The node 100 comprises four primary components, including a management agent ("MA") 102, which resides in a management plane 103; a resource server system ("RSS") 104 and a flow measurement system ("FMS") 106, both of which reside in a control plane 107; and hardware forwarding units ("HFUs") 108, which reside in a data plane 109. The configuration of the node 100 gives rise to static and dynamic functionality portions of the node 100, as will be described in greater detail with reference to FIG. 2.

In the case of DiffServ QoS, the MA 102 performs DiffServ PIB management functionality. The RSS 104 on the control plane 107 controls IP packets through the data plane 109 based on a PIB table. The FMS 106 monitors packet flows through the HFUs 108 on the data plane 109. The elements 102, 104, 106, and 108, will be described in greater detail below with reference to FIGS. 2, 3, and 4.

Figure 1B:
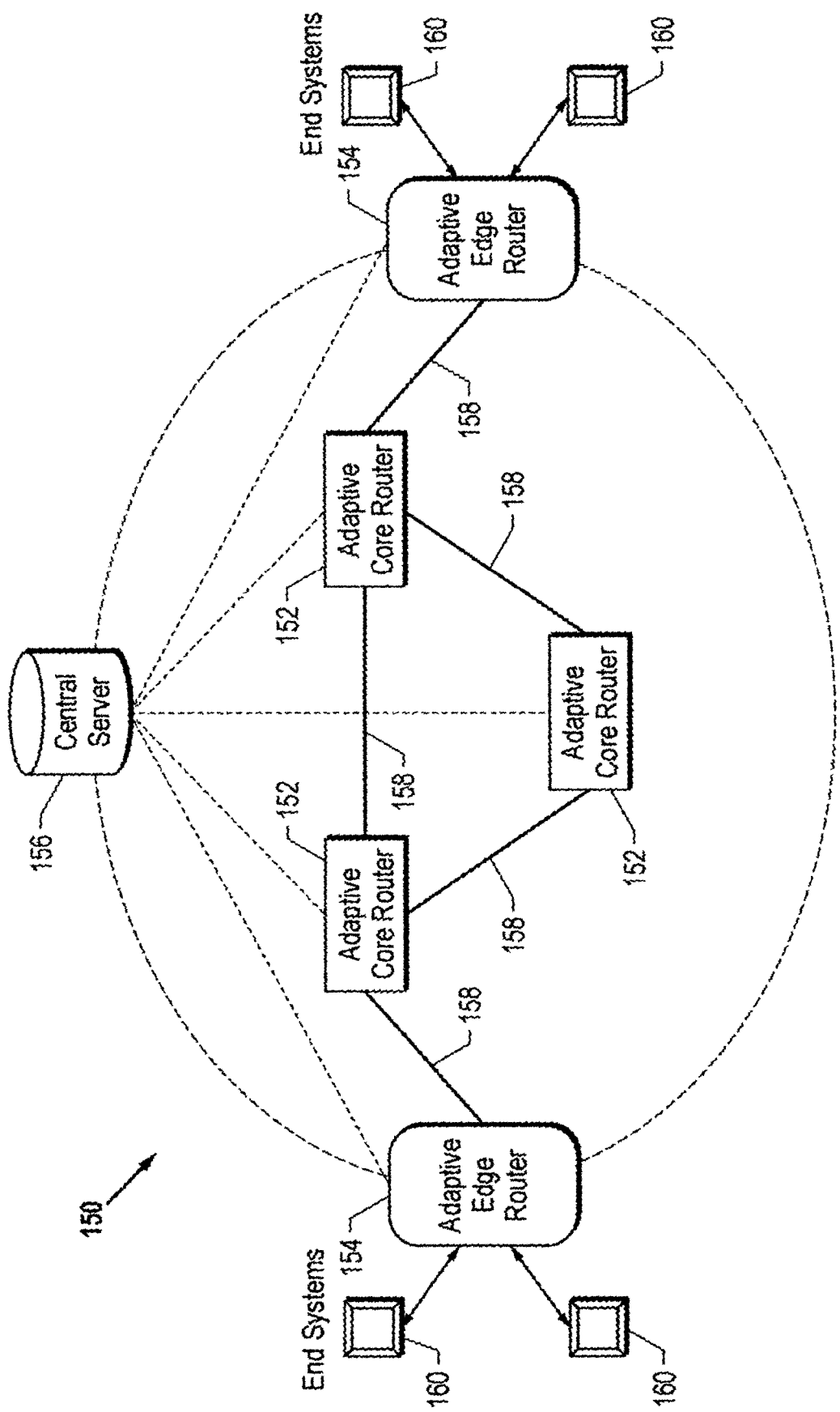
FIG. 1B is a block diagram of one embodiment of an IP network in which the router of FIG. 1A may be implemented.

FIG. 1B illustrates an IP network 150 comprising a plurality of adaptive core routers 152 and adaptive edge routers 154 functioning under the control of a single central server ("CS") 156. The CS 156 comprises provides a network-wide management and provisioning entity, such as a bandwidth broker. It will be recognized that, in accordance with one embodiment, the architecture of each of the routers 152, 154, is as illustrated in FIG. 1A and described in greater detail below. In general, an "adaptive router" is equivalent to a standard router with the addition of a local monitor and a local controller, as also described below.

The routers 152, 154, are interconnected via links 158. Additionally, the edge routers 154 may be connected to end systems 160. The core routers 152 support data level adaptations, the edge routers 154 support flow level adaptations, and the CS 156 supports network level adaptations.

Figure 2:
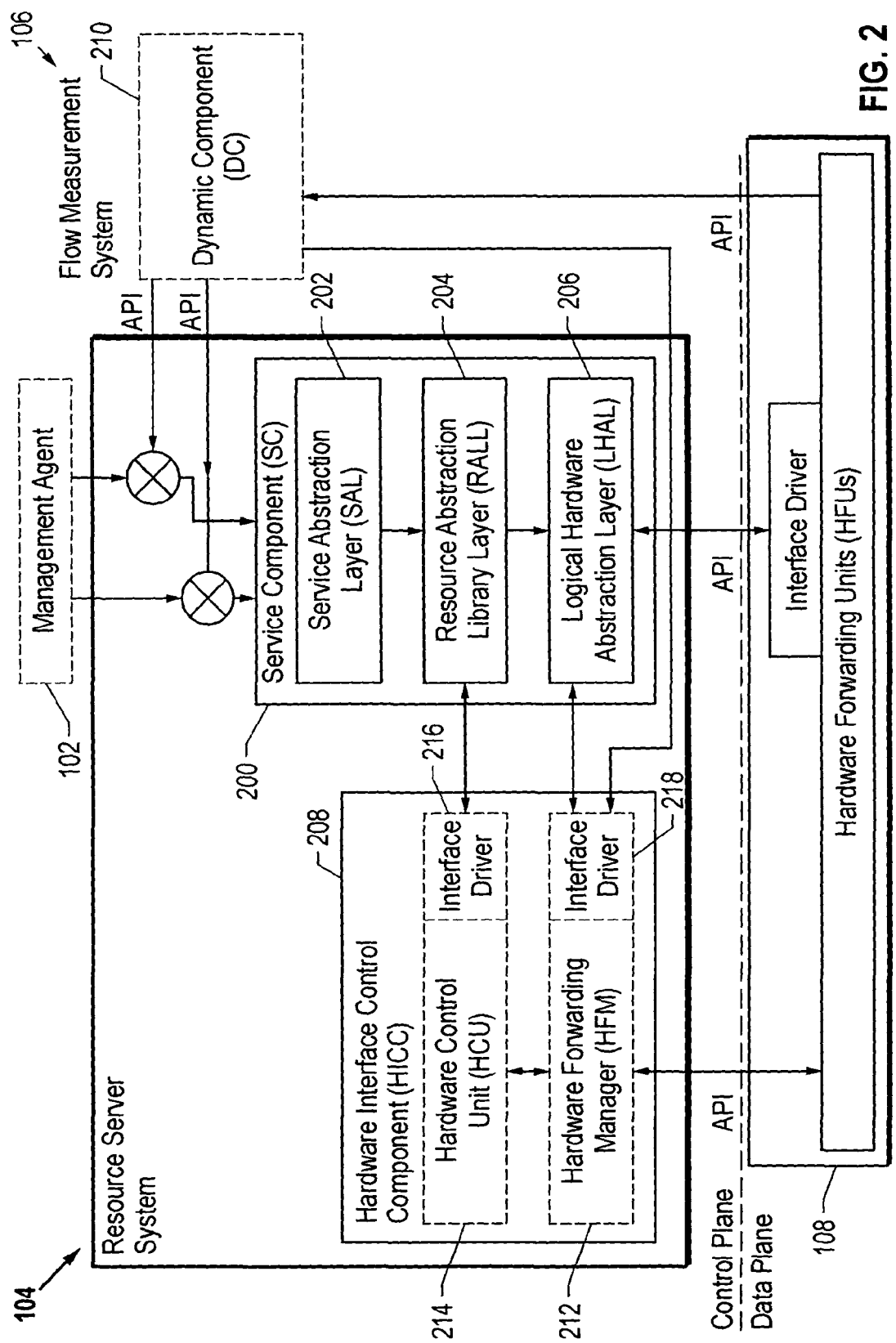
FIG. 2 is a block diagram of one embodiment of a Resource Server System of the router of FIG. 1A.

FIG. 2 illustrates the architecture of the RSS 104. As shown in FIG. 2, the RSS 104 includes a service component ("SC") 200 with three distinct layers, including a Service Abstraction Layer ("SAL") 202, a Resource Abstraction Library Layer ("RALL") 204, and a Logical Hardware Abstraction Layer ("LHAL") 206, and a Hardware Interface Control Component ("HICC") 208. Again, in the context of DiffServ QoS, the SAL 202 of the SC 200 uses PIB tables (not shown) to define a configuration and management table (not shown) of the DiffServ interface in terms of a Traffic Control Block ("TCB") and selects a sequence of resource abstraction elements. The SAL 202 is also controlled by a Dynamic Component ("DC") 210 to adapt to dynamic service requirements and resource conditions through actions such as adjusting bandwidth, loop gain, and sampling rate without generating instability.

The RALL 204 of the SC 200 has an open architecture with a library of router and resource management algorithms (e.g., classifier, meter, queue) selected by the TCB. The RALL 204 provides control to a Hardware Forwarding Manager ("HFM") 212 of the HICC 208 via a Logical Hardware Abstraction Layer ("LHAL") 214. The RALL 204 contains only the algorithms that have no contents of the physical layer hardware. The LHAL 206 contains only the logical hardware elements (i.e., the finest units to compose the network element resources and service function behaviors), which are monitored by the MDC (FIG. 3A) of the DC 210. The HICC 208, in turn, contains the HCU 214, which is connected through an interface driver 216 to the RALL 204, and the HFM 212, which is connected through an interface driver 218 to the LHAL 206 and the DC 210. The HCU 214 of the HICC 208 controls the HFU 108 packets via the HFM 212. The RALL 204 of the SC 200 can bypass the HCU 214 and directly control the HFM 212 via the LHAL 206. Generally, the vendor's line cards with interface driver software will support the HICC 208. The advantages of such an architecture for the RSS 104 are described in detail below.

Figure 3A:
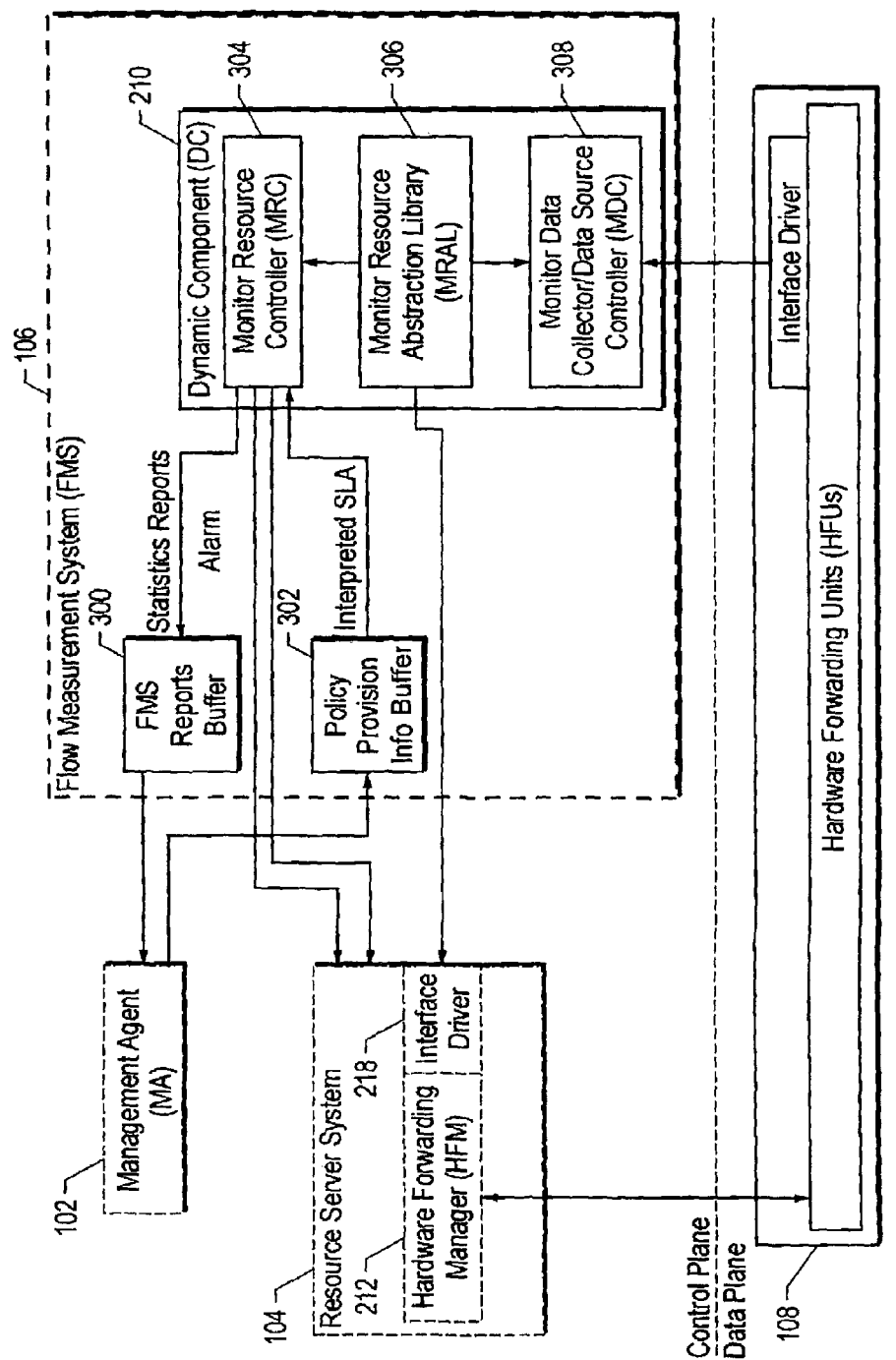
FIG. 3A is a block diagram of one embodiment of a Flow Measurement System of the router of FIG. 1A.

FIG. 3A illustrates the architecture of the FMS 106. The FMS 106 contains the DC 210, an FMS Reports Buffer ("FMSRB") 300 and a Policy Provision Info Buffer ("PPIB") 302. The DC 210 in turn is comprised of three layers, including a Monitor Resource Controller ("MRC") 304, a Monitor Resource Abstraction Library ("MRAL") 306, and a Monitor Data Collector/Data Source Controller ("MDC") 308. In the DiffServ adaptation, the DC 210 receives interpreted service level agreement ("SLA") from the PPIB 302 and sends flow measurement statistics ("FMS") reports/alarms to the FMSRB 300.

The MRC 304 receives interpreted SLA from the PPIB 302 and produces Observation Domain Blocks (ODBs) (FIG. 4) in terms of a sequence of MRAL 306 elements (i.e. Metering Process, Selection Criteria for Flow Export, Export Process, and Data Collector). By executing ODB sequence elements, an FMS system is performed at line speed, broader bandwidth with open software architecture and open hardware architecture.

The MRAL 306 acts as a real-time monitor executive to collect and aggregate data sources ("DS") statistics, prepare DS statistics reports, distribute protocols, relocate hardware resources, adjust an AQoS scaler/loop, and determine data collection sampling rates. The MRAL 306 also controls the HFM 212 of the RSS 104 via the Interface Driver 218. A connection loop from the MRAL 306 to the HFM 212, from the HFM 212 to the HFUs 108, from the HFUs 108 to the MDC 308 and from the MDC 308 back to the MRAL 306 forms a dynamic adaptive scalable closed loop, which is based on FMS SLA and is dynamically controlled by real-time traffic flows. The MRAL 306 is an open architecture design; it allows FMS algorithm insertion/deletion to the system without disturbing system software or hardware performances. The MRAL 306 includes a DS Monitor SLA Interpretation and Statistics Reporting group, a Counter Aggregation control group, a Capabilities group, a Computer Resource group, an AQoS Scaler/Loop Gain Adjuster group, a Data Collector group, and an IP Flow and Measuring group.

The DS Monitor SLA Interpretation and Statistics Reporting group communicates with a Policy Provision Agent and performs SLA interpretation to modify a Service Component Policy Information Base (PIB) table based on the dynamic resource management of the Capabilities and Computing Resource groups in order to meet the SLA requirements. It also reports the DS statistics, Protocol statistics, Network Protocol Host statistics, and Application Protocol Matrix statistics by invoking the Counter Aggregation Control and Data Collection groups.

The Counter Aggregation control group controls how individual DiffServ codepoint counters are aggregated in data collections. The Capabilities group describes the groups that are supported by the agent on at least one data source and includes the following modules: (1) total capability calculation; (2) effective bandwidth determination; and (3) minimized cost based on traffic weight class.

The Computer Resource group comprises the computer or hardware resources that can be dynamically allocated to meet the SLA requirements through invoking the Capabilities group module. The AQoS Scaler/Loop Gain Adjuster group is based on invoking of IP Flow Monitor & Measuring group module to determine the sampling rate, bandwidth, loop gain, and stability. It is a real-time adaptive closed loop control, which is based on IP DiffServ SLA, IP flow measurement requirements (from measurement SLA), and observation points.

The Data Collector group controls how individual statistical collections are maintained by the agent and reported to management applications. The Data Collection group collects DS statistics, Protocol statistics, Network Protocol Host statistics and Application Protocol Matrix statistics. The IP Flow Monitor & Measuring group provides a standard way of exporting information related to IP flows for monitoring and measuring and includes the following modules: (1) Flow Classification; (2) Packets Selection Criteria: (3) Metering Process; (4) Selection Criteria for Flow Export; (5) Flow Expiration, (6) Packet Counter and Dropper Counter; (7) Time Stamping; (8) Sampling Method; (9) Exporting Process; (10) Collecting Process; and (10) Effective Bandwidth Measurement.

Figure 3B:
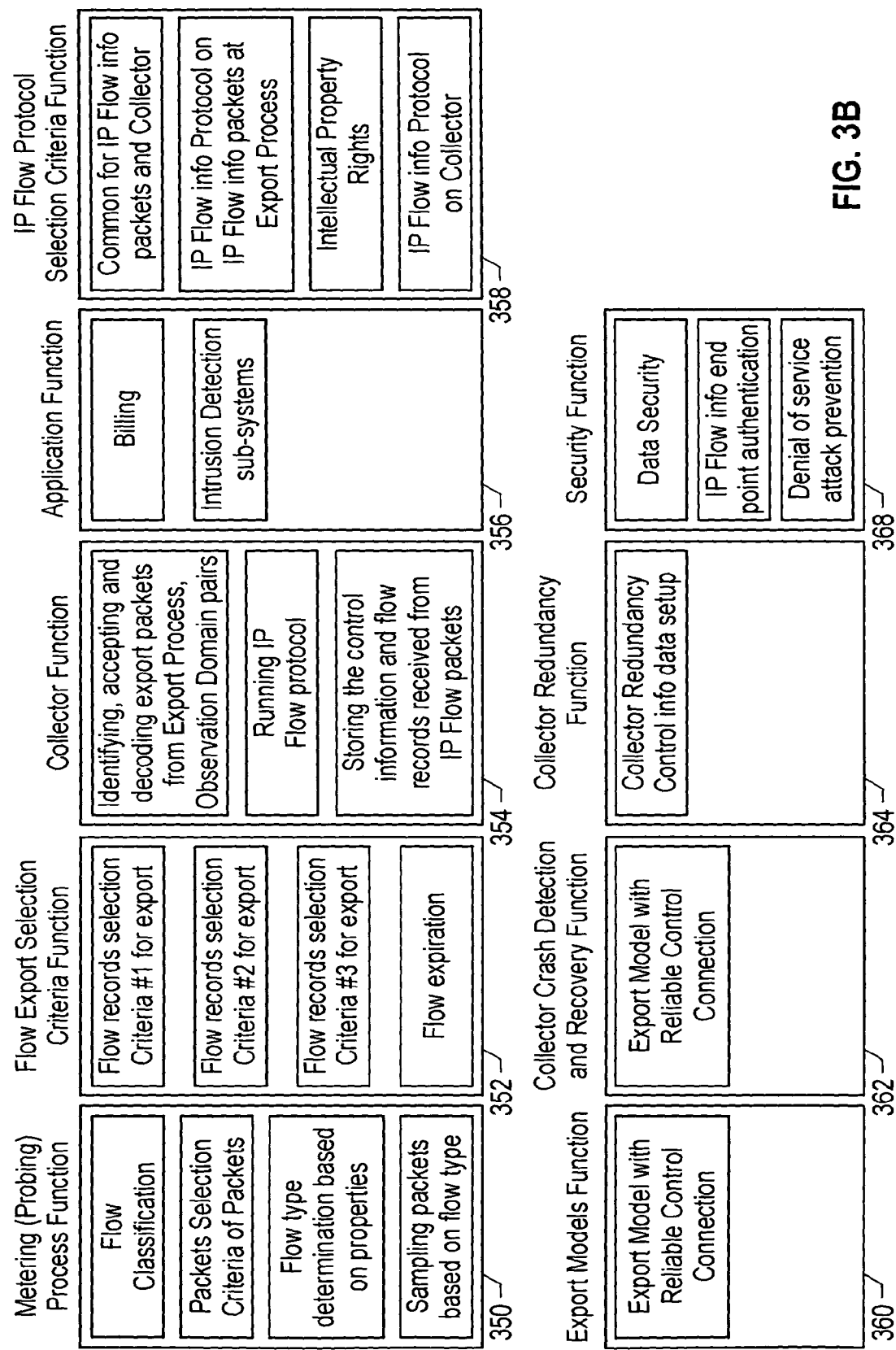
FIG. 3B is illustrates the functions of IP Flow Monitor and Measuring group modules of the router of FIG. 1A.

FIG. 3B illustrates the functions performed by the IP Flow Monitor & Measuring group modules. In general, these modules perform metering (probing) process functions 350, flow export selection criteria functions 352, collector functions 354, application functions 356, IP flow information protocol selection criteria functions 358, an export model function 360, a collector crash detection and recovery function 362, a collector redundancy function 364, and security functions 366.

Figure 4:
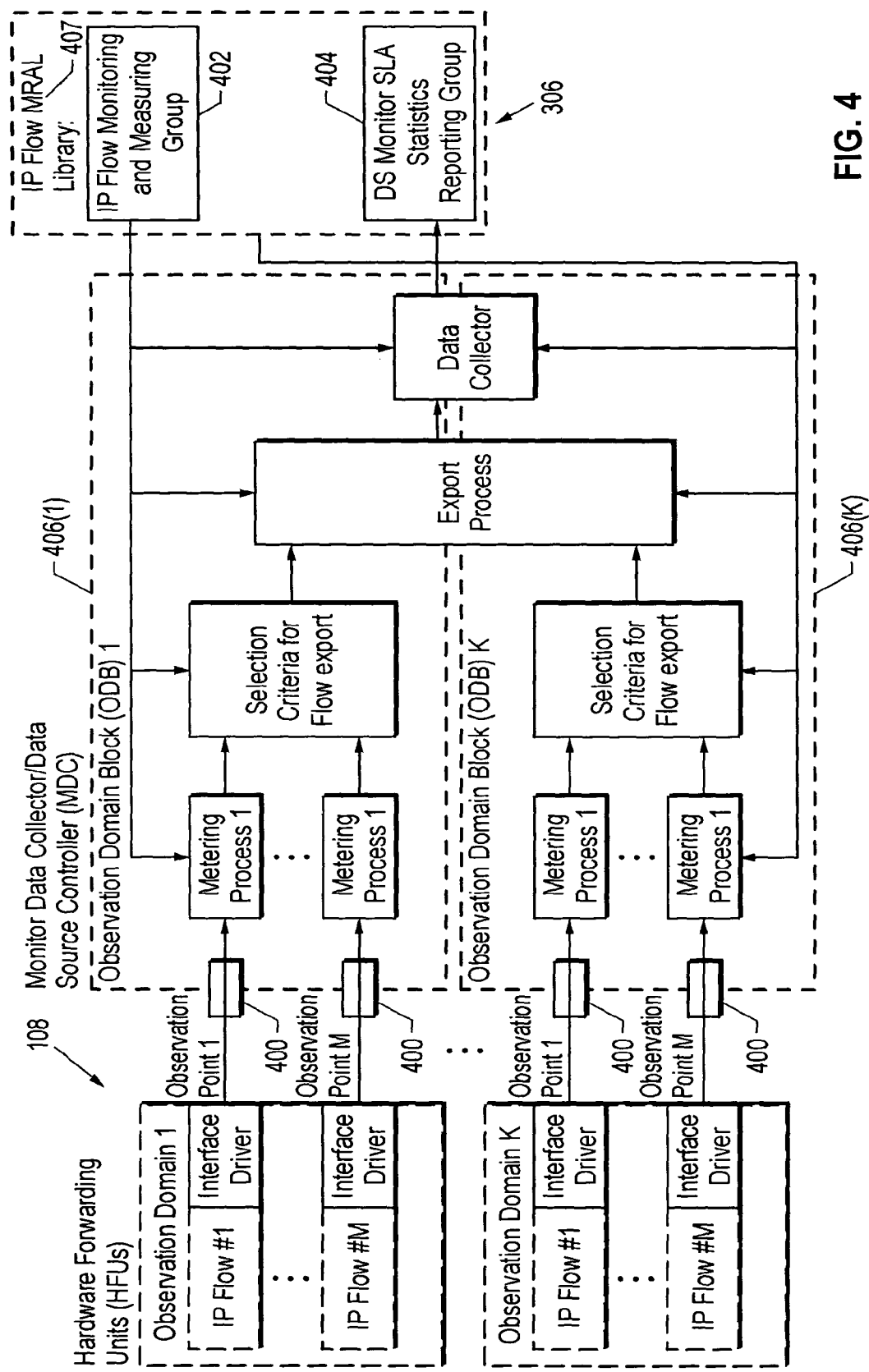
FIG. 4 is a block diagram of one embodiment of a Monitor Data Collector ("MDC") of the router of FIG. 1A.

FIG. 4 illustrates the architecture of the MDC 308. The MDC 308 is generally deployed into an M×N matrix of processor elements ("PEs") based on the number of observation points 400 of the HFUs 108. In the DiffServ implementation, the HFUs 108 on the data plane 109 can be partitioned into the desired number of observation points 400 based on the SLA received from the PPIB 302 processed by the MRC 304 using an IP Flow Monitoring and Measuring Group Module 402 and DS Monitor SLA Statistics Reporting Group Modules 404 to form Observation Domain Blocks ("ODBs") 406(1)-406(k). The IP flow MRAL library 407 of the MRAL 306 acts as a real-time monitor executive by performing functions such as collecting, aggregating, generating DS statistics reports, distributing protocols, relocating hardware resources, adjusting QoS levels, and determining data collection sampling rates. The MRAL 306 also controls the HFM 212 of the RSS 104 via an interface driver 218.

The MRAL 306-HFM 212-HFU 108-MDCL 308-MRAL 306 connection forms a dynamic adaptive scalable closed loop. The IP flow MRAL library 407 is an open architecture design allowing real-time flow measurement algorithm insertion/deletion without disturbing system software or hardware. Again, in the case of DiffServ QoS, the MRC 304 receives interpreted SLA from the PPIB 302 and produces ODBs in terms of a sequence of MRAL 306 elements (i.e., the metering process, section criteria for flow export, export process, data collector, etc.). By executing ODB sequence elements, the FMS 106 performs at line speed and broader bandwidth with open software architecture and open hardware architecture.

Figure 5:
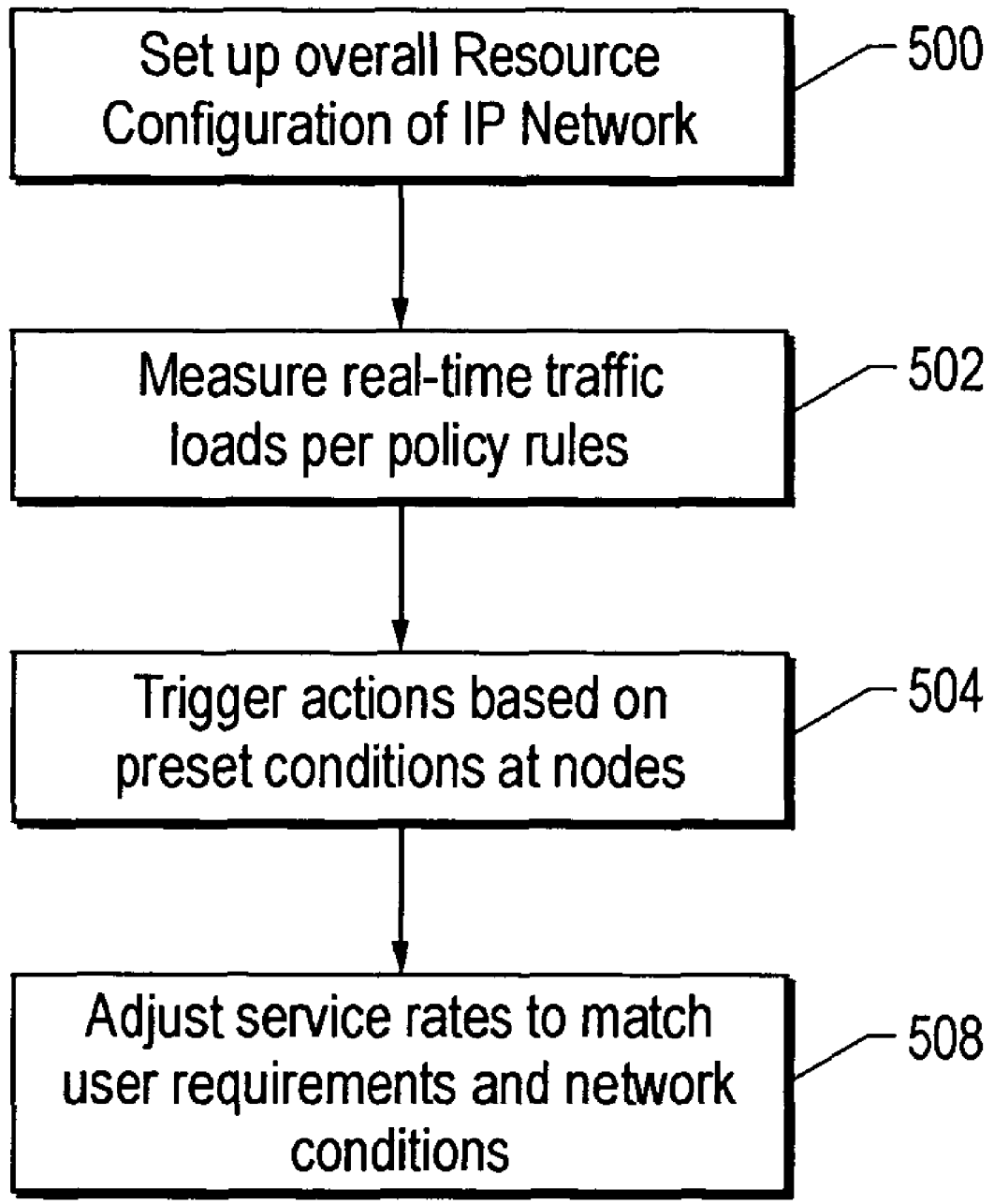
FIG. 5 is a flowchart of one example of the operation of the router of FIG. 1A.

A flowchart illustrating an example of a typical operational scenario that is supported by the adaptive router 100 in an IP network is set forth in FIG. 5. In step 500, the overall resource configuration of the network is be set up by a centralized unit, such as the CS 156 (FIG. 1), and passed onto each router's configuration through the MA 402. In step 502, traffic monitors embedded in the enhanced routers, such as the router 100, measure the real-time traffic loads per a prescribed set of policy rules. In step 504, individual nodes trigger actions on the basis of preset conditions at data, flow, and network (reporting to the centralized unit) time scales. In step 508, the controller in the nodes and the centralized unit will then adjust service rates to match the requirements of the user and the network conditions in a coordinated manner.

Several advantages over the prior art are realized by the embodiments described herein. Such advantages include that the connection in the MRAL-HFM-HFU-MDU, along with the reporting capability of the node 100 to the centralized controller forms feedback mechanisms for enabling an adaptive control system at multiple time scales. In addition, the layered architecture of the RS and FMS affords the advantages set forth below.

1. The SAL and MRC have zero hardware contents, thus allowing functions such as SLA to be implemented directly without the knowledge of system low level hardware interfaces. This will save time in complying with service contracts.
2. The RALL and MRAL algorithm insertion/deletion has zero effect on the system software, thus speeding up system upgrade or developments.
3. The HICC and HFU are implemented with hardware (e.g., high-speed network processors or FPGAs) for high speed and high performance gains.
4. Automatic translation of SAL to LHAL through the use of RALL Library elements speeds up the software coding process.
5. The LHAL has zero contents of network element resources and service functional behaviors, thus universal hardware interface to any HICCs and HFUs can be implemented.
6. The HICC and HFU are vendor-supported hardware (line cards) and software (APIs and interface drivers). This provides shorter system hardware and software integration time.
7. Observation points of HFU can be configured into an M×N matrix of PEs for achieving parallel and pipelined processing of data collection.

Based upon the foregoing Detailed Description, it should be readily apparent that the present invention advantageously provides an architecture for implementing multi-time scale adaptive IP routers.

It is believed that the operation and construction of the present invention will be apparent from the Detailed Description set forth above. While the exemplary embodiments of the invention shown and described have been characterized as being preferred, it should be readily understood that various changes and modifications could be made therein without departing from the scope of the present invention as set forth in the following claims.

What is claimed is:

1. A packet router that supports multi-time scale resource management, comprising:
 a management agent ("MA") that manages a differentiated services policy information database operable to store policies on forwarding packets in the packet router;
 a resource server system ("RSS") that controls forwarding of packets in the packet router based on adaptive selections of policies from the policy information database;
 a flow measurement system ("FMS") that monitors packet flows through the packet router and generates statistic reports which affect the RSS selection of control;
 wherein the FMS includes:
   a dynamic component for controlling adaptation of the packet router to dynamic service requirements and resource conditions, wherein the dynamic component further comprises;
   a monitor resource controller for receiving adaptive selections of policies from the policy information database and for distributing the generated statistics reports; and
   a monitor resource abstraction library that functions as a real-time monitor executive and generates the statistics reports; and a hardware forwarding engine ("HFE") that receives and forwards packets in response to the RSS controls.

2. The packet router of claim 1 wherein the MA resides in a management plane of a communications network.

3. The packet router of claim 1 wherein the RSS resides in a control plane of a communications network.

4. The packet router of claim 1 wherein the HFE resides in a data plane of a communications network.

5. The packet router of claim 4 wherein the communications network comprises an Internet protocol ("IP") network.

6. The packet router of claim 1 wherein the FMS includes a monitor data collector/data source controller ("MDC") for receiving data collected at observation points of the HFE.

7. A system for supporting multi-time scale resource management in a packet router, the system comprising:
    means for managing a differentiated services policy information database that stores policies on forwarding packets in the packet router;
    means for controlling forwarding of packets in the packet router based on adaptive selections of policies from the policy information database;
    means for monitoring packet flows through the packet router based on an interpreted service level agreement related to the adaptive selections of policies from the policy information database;
    means for generating statistic reports that affect a resource server system selection of controls;
    wherein the means for generating statistic reports further comprises:
        a reports buffer for buffering the generated statistics reports;
        a policy information buffer; and
        a dynamic component for controlling adaptation of the packet router to dynamic service requirements and resource conditions, wherein the dynamic component further comprises:
            a monitor resource controller for receiving adaptive selections of policies from the policy information database and for distributing the generated statistics reports;
            a monitor resource abstraction library that functions as a real-time monitor executive and generates the statistics reports; and
            a monitor data collector/data source controller for receiving data collected at observation points of means for receiving and forwarding; and
    means for receiving and forwarding packets in response to the resource server system selection of controls.

8. The system of claim 7 wherein the means for managing is a management agent ("MA").

9. The system of claim 7 wherein the means for controlling forwarding of packets in the packet router is a resource server system ("RSS").

10. The system of claim 7 wherein the means for receiving and forwarding is a hardware forwarding engine ("HFE").

11. The system of claim 7 wherein the means for monitoring is a flow measurement system ("FMS").

12. The system of claim 11 wherein the means for generating statistic reports is a flow measurement system ("FMS").

13. A method of providing multi-time scale resource management in a packet router, the method comprising:
    managing a differentiated services policy information database that stores policies on forwarding packets in the packet router;
    controlling forwarding of packets in the packet router based on adaptive selections of policies from the policy information database;
    monitoring packet flows through the packet router;
    generating statistic reports by a monitor resource abstraction library that affects the forwarding of packets in the packet router, and which operates as a real-time monitor executive;
    controlling adaptation of the packet router to dynamic service requirements and resource conditions;
    receiving adaptive selections of policies from the policy information database and distributing the generated statistics reports;
    receiving data at a monitor data collector/data controller, where in the data is collected at observation points of a hardware forwarding engine; and
    receiving and forwarding packets in response to the control of the forwarding of packets in the packet router.

14. The method of claim 13 wherein the managing is performed by a management agent.

15. The method of claim 13 wherein the controlling forwarding of packets in the packet router is performed by a resource server system.

16. The method of claim 13 wherein the monitoring is performed by a flow measurement system.

17. The method of claim 13 wherein the generating statistic reports are also performed by a flow measurement system.

18. The method of claim 13 wherein the receiving and forwarding is performed by the hardware forwarding engine.

* * * * *